United States Patent
van Blokland

(10) Patent No.: US 9,414,604 B2
(45) Date of Patent: Aug. 16, 2016

(54) METHOD AND DEVICE FOR TREATING DOUGH

(71) Applicant: Radie B.V., Culemborg (NL)

(72) Inventor: Johannes Josephus Antonius van Blokland, Beusichem (NL)

(73) Assignee: Radie B.V., Culemborg (NL)

( * ) Notice: Subject to any disclaimer, the term of this patent is extended or adjusted under 35 U.S.C. 154(b) by 242 days.

(21) Appl. No.: 13/946,365

(22) Filed: Jul. 19, 2013

(65) Prior Publication Data

US 2014/0020530 A1    Jan. 23, 2014

(30) Foreign Application Priority Data

Jul. 19, 2012   (EP) .................................... 12177160

(51) Int. Cl.
*A21C 11/10*   (2006.01)
*A21C 9/08*   (2006.01)
*A21C 3/06*   (2006.01)

(52) U.S. Cl.
CPC ................. *A21C 11/10* (2013.01); *A21C 9/085* (2013.01); *A21C 3/06* (2013.01); *Y10T 83/04* (2015.04); *Y10T 83/654* (2015.04)

(58) Field of Classification Search
CPC .......... A21C 11/10; A21C 7/01; A21C 9/081; A21C 9/085; Y10T 83/04; Y10T 83/654
USPC .......... 83/39, 422, 102, 106, 102.1, 105, 107, 83/112, 508.3, 425.3, 425.4; 99/450.1, 99/450.2; 426/500–503, 518
See application file for complete search history.

(56) References Cited

U.S. PATENT DOCUMENTS

| | | | | |
|---|---|---|---|---|
| 3,053,291 A | * | 9/1962 | Meissner | B27B 25/04 144/252.1 |
| 4,230,005 A | * | 10/1980 | Varga | B23D 45/021 83/100 |
| 4,306,850 A | * | 12/1981 | Cummins | A21C 7/01 425/332 |
| 5,979,525 A | * | 11/1999 | Durney | B23D 47/12 144/136.95 |
| 6,119,572 A | * | 9/2000 | Korus | B26D 9/00 83/425.3 |
| 6,248,384 B1 | * | 6/2001 | Morikawa | A21C 7/01 426/496 |
| 2007/0186739 A1 | * | 8/2007 | Peot | B27G 19/08 83/102.1 |

FOREIGN PATENT DOCUMENTS

| | | | | |
|---|---|---|---|---|
| EP | 0377964 A1 | 7/1990 | | |
| FR | 2195892 A | 3/1974 | | |
| FR | 2195892 A5 | * 3/1974 | ............... | A21C 3/02 |
| GB | 2265109 A | 9/1993 | | |
| NL | 6516789 | 4/1966 | | |
| NL | 6516789 A | * 4/1966 | ............... | A21C 7/01 |

\* cited by examiner

*Primary Examiner* — Sean Michalski
*Assistant Examiner* — Liang Dong
(74) *Attorney, Agent, or Firm* — The Webb Law Firm

(57) ABSTRACT

The present invention relates to a device for treating dough, comprising an essentially horizontally extending conveyor, for conveying a flat dough sheet, at least one mat, arranged above the conveyor, with its end downstream the direction of conveyance resting on or slightly above the conveyor, for rolling up the dough sheet when it is conveyed underneath, at least one fence, forming a blunt sealing knife, arranged vertically at a distance above the conveyor surface and extending in the direction of conveyance, downstream the at least one mat, for notching and therewith sealing the rolled up dough sheet without cutting it and at least one rotatable knife, arranged at the downstream outermost end of the fence and in the plane of said fence, for cutting the notched dough piece. The invention further relates to a method for treating dough.

9 Claims, 4 Drawing Sheets

METHOD AND DEVICE FOR TREATING DOUGH

CROSS-REFERENCE TO RELATED APPLICATIONS

This application claims priority under 35 U.S.C. §119(a)-(d) to European Application No. 12177160.4 filed on Jul. 19, 2012 in the European Intellectual Property Office, the disclosure of which is hereby incorporated by reference in its entirety.

BACKGROUND OF THE INVENTION

1. Field of the Invention

The present invention relates to a method and device for treating dough. In particular, the invention relates to dividing a dough piece into multiple pieces, and pivoting these pieces before transferring them into a baking tin.

2. Discussion of Related Art

Dividing a dough piece in multiple (often four or six) pieces is well known in the art. The step is applied in particular in the process of baking tin bread, and leads to a better structure of the resulting bread, that is, if the process is well controlled and executed.

The Dutch patent NL 6 516 789 discloses a device for treating dough, comprising an essentially horizontally extending conveyor, for conveying a flat dough sheet, at least one mat, arranged above the conveyor, with its end downstream the direction of conveyance resting on or slightly above the conveyor, for rolling up the dough sheet when it is conveyed underneath and at least one rotatable knife, arranged at the downstream outermost end of the fence and in the plane of said fence, for cutting the notched dough piece.

The French patent FR 2 195 892 discloses an apparatus at least one fence, forming a blunt sealing knife, arranged vertically at a distance above the conveyor surface and extending in the direction of conveyance, downstream the at least one mat, for notching and therewith sealing the rolled up dough sheet without cutting it.

Various embodiments for dividing dough into pieces and delivering these pieces to tins, are thus known in the art, they all have specific disadvantages. Obtaining pieces with equal sizes within very fine margins, and arranging the pieces in the tin at accurate angles does not often succeed.

It is a goal of the present invention to take away the above disadvantages at least partly, and/or to provide a useful alternative to the state of the art.

SUMMARY OF THE INVENTION

According to the present invention, a device for treating dough is proposed, comprising an essentially horizontally extending conveyor, for conveying a flat dough sheet, at least one mat, arranged above the conveyor, with its end downstream the direction of conveyance resting on or slightly above the conveyor, for rolling up the dough sheet when it is conveyed underneath, at least one fence, forming a blunt sealing knife, arranged vertically at a distance above the conveyor surface and extending in the direction of conveyance, downstream the at least one mat, for notching and therewith sealing the rolled up dough sheet without cutting it and at least one rotatable knife, arranged at the downstream outermost end of the fence and in the plane of said fence, for cutting the notched dough piece.

According to the invention, the flat dough sheet is obtained by a so called sheeting process, wherein dough is delivered to the conveyor in a continuous process, in order to be rolled flat and of equal width throughout its length in the direction of conveyance. In a next step, a cutter is available, to divide the continuous dough sheet in parts of a length that corresponds to the amount of dough required for one bread. The at least one mat, arranged above the conveyor, with its end downstream the direction of conveyance resting on or slightly above the conveyor, subsequently serves for rolling up the dough sheet when it is conveyed underneath. At least one fence, forming a blunt sealing knife, is arranged vertically at a distance above the conveyor surface and extending in the direction of conveyance, downstream the at least one mat, for notching and therewith sealing the rolled up dough sheet without cutting it.

Since the dough behaves as plastically deformable material, it tends to bend back to its original shape, and therefor the fence may even leave a space from the conveyor that is less than half of the thickness of the rolled up dough sheet. Sealing the dough piece has the advantage that its sides are less sticky which is beneficial for keeping their intended shape and enables further handling without causing unnecessary damages.

The thus notched and sealed dough pieces are subsequently cut by at least one rotatable knife, arranged at the downstream outermost end of the fence and in the plane of said fence. A rotatable (or in use: rotating) knife has the advantage that a straight cut can be obtained relatively quickly, without affecting the form of the dough piece. The direction of rotation of the knife may be chosen such that the dough piece is pushed onto the conveyor when it first encounters the knife. As a result, the dough pieces tend to stay at their position relative to the conveyor, which is desired, to keep the pieces, once cut, inline.

In a preferred embodiment, the end of the fence adjacent to the rotatable knife form-fits the knife. The knife can then be arranged closely behind the fence, that is, within for example a few millimeters to one centimeter, so that the rolled up dough is kept in place by the fence and the conveyor when it reaches the knife and is cut. It is for the reason of keeping the position of the dough pieces also preferred that the conveyor extends in the same plane, beyond the rotatable knife, whereas state of the art solutions often have a ramp or even a free fall movement of the dough pieces.

The stable and reproducible positioning of the dough pieces can be further assured by providing the device with at least a second and a third mat, arranged at both sides beside the at least one rotatable knife, for enabling synchronous movement of cut dough pieces. In case of a plurality of knives and/or fences, multiple mats may be applied, for guiding each cut piece.

Once the rolled up dough piece is cut, its cut parts need to be pivoted, which is preferably done at a lower speed than the speed at which the dough pieces is led across the fence and the knife Thereto, in the device according to the present invention, the conveyor may comprise two parts, wherein a first part has a first speed, and a second part, starting behind the knives, has a second speed, which is for instance about 5 to 10 times lower than the first speed.

For pivoting the dough pieces, the device may be equipped with a pin, arranged behind the at least one knife in the direction of conveyance, for pivoting the cut dough pieces thereabout; and at least one pair of vertically arranged conveyors, starting downstream the knife and extending in the direction of conveyance, for guiding the dough pieces once they are cut, and thus further keeping them inline with each other.

In a further embodiment, the device according to the invention further comprises a second pin, arranged downstream from the first pin, for securing the pivoting of the those dough pieces that did not or not completely pivot as desired. The pins may be exchangeable, for treating various kinds of dough, and the second pin may have a larger diameter than the first pin.

In yet a further embodiment, the invention comprises at least one pair of vertically extending conveyors, extending in the direction of conveyance for guiding and pressing the rotated dough pieces, for guiding the dough pieces, and pushing and/or pressing them in order to position them straight with respect to each other.

BRIEF DESCRIPTION OF THE DRAWINGS

The invention will now be explained into more detail, with reference to the following figures. Herein.

DESCRIPTION OF THE INVENTION

Figure 1:
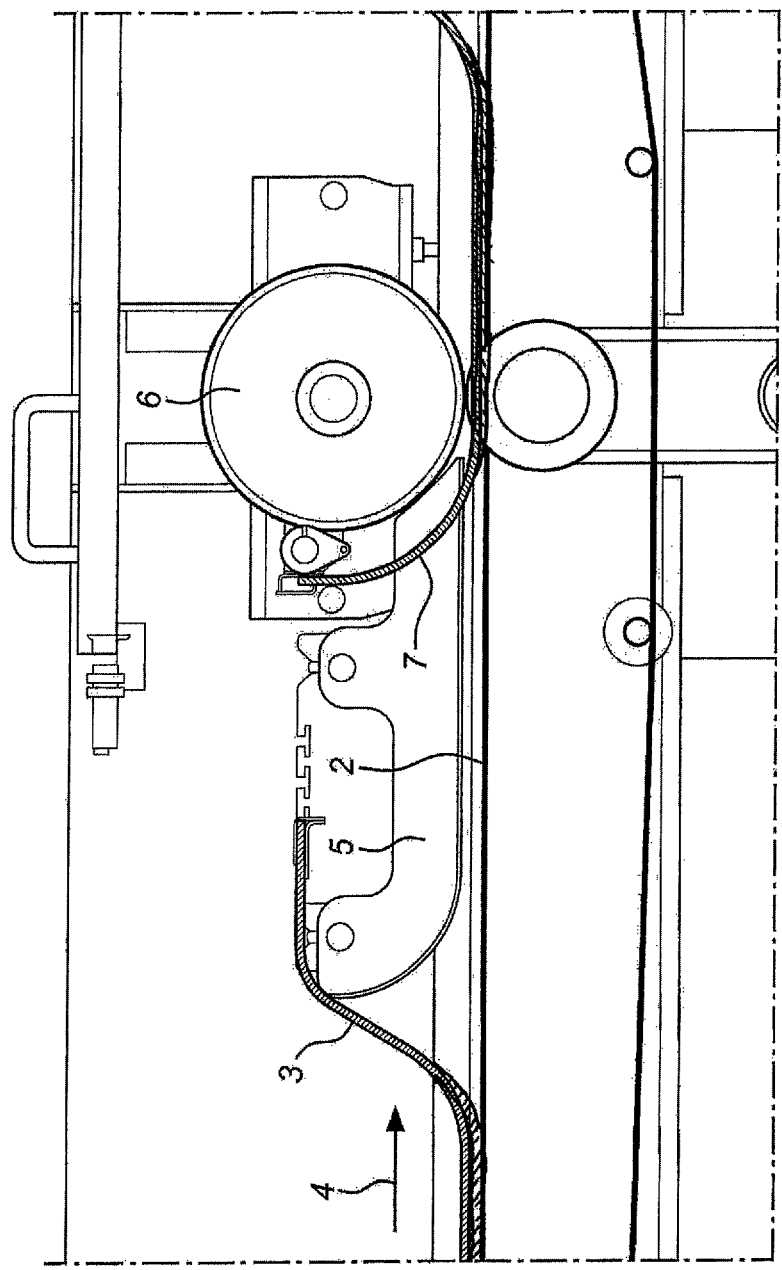
FIG. 1 shows a side view of a detail of the invention.

FIG. 1 shows a side view of a detail of a device 1 according to the invention. The device 1 comprises an essentially horizontally extending conveyor 2, for conveying a flat dough sheet (not depicted), and a mat 3, arranged above the conveyor 2, with its end downstream the direction of conveyance 4 resting on or slightly above the conveyor 2, for rolling up the dough sheet when it is conveyed underneath. Furthermore, the device comprises a number of fences 5, forming blunt sealing knives, arranged vertically at a distance above the conveyor surface and extending in the direction of conveyance, downstream the at least one mat, for notching and therewith sealing the rolled up dough sheet without cutting it. The blunt knives 5 gradually get closer to the conveyor, and then stretch at a constant height over a certain distance, preferably such distance over which the roll turns multiple times. Furthermore, behind each fence, in a direction of movement, a rotatable (cutting) knife 6 is arranged at the downstream outermost end of said fence and in the plane of said fence, for cutting the notched dough piece. As visible in FIG. 1, the end of each fence adjacent to the rotatable knife form-fits the knife. FIG. 1 further shows mats 7 arranged at both sides beside the rotatable knife 6, for enabling synchronous movement of cut dough pieces. The conveyor extends in the same plane, beyond the rotatable knife.

Figure 2:
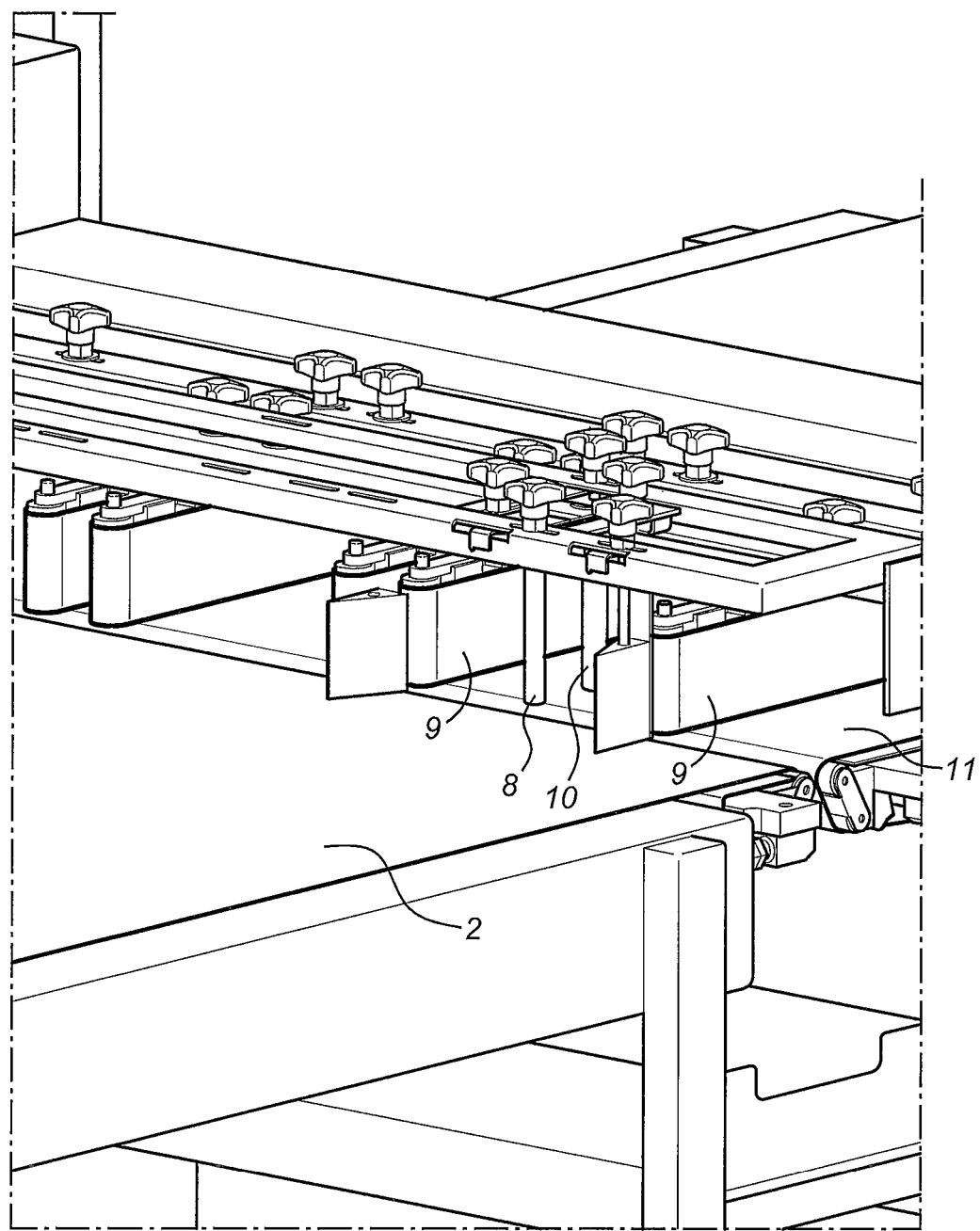
FIG. 2 shows a perspective view of a detail of the invention.

FIG. 2 shows a perspective view of a part of the device 1, for reasons of clarity shown in a taken apart situation from the part in FIG. 1. The device 1 comprises a first pin 8, arranged behind the at least one knife in the direction of conveyance, for pivoting the cut dough pieces thereabout; and a pair of vertically arranged conveyors 9, starting downstream the knife and extending in the direction of conveyance, for guiding the cut dough pieces. Furthermore, a second pin 10, arranged downstream from the first pin 8, is present for further rotating the dough pieces. The pins 8, 10 are exchangeable, for treating various kinds of dough, and in practice, the second pin 10 may have a larger diameter than the first pin 8.

The conveyor comprises two parts 2, 11, wherein the first part 2 has a first speed, and the second part 11, starting behind the knives, and just where pin 8 is situated, has a second speed, factor of 5 to 10 lower than the first speed. In practice, the speeds may have a proportion of 5:1 to 10:1, which gives the speed of the dough pieces under the mats a proportion of 2.5:1 to 5:1 depending on the lay-out of the line. After being cut, some distance, for instance multiple tens of centimeters, may exist between the end of the mat 7 and the first pin 8. This raises the speed of the cut dough pieces to the conveyor speed and helps to pivot them correctly.

Figure 3:
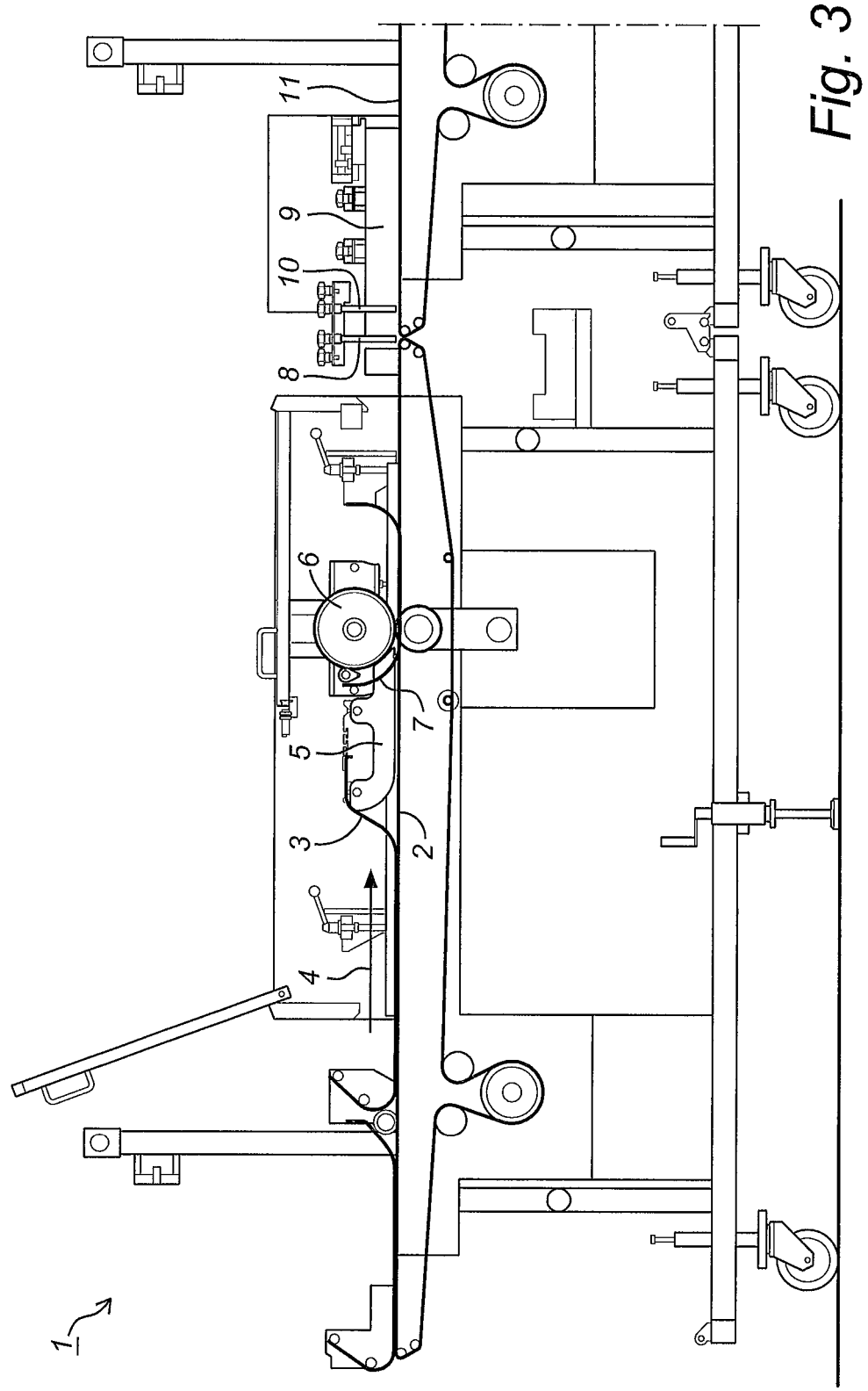
FIG. 3 shows a side view of the device according to the invention.

FIG. 3 shows a side view of the device according to the invention, wherein same reference numbers refer to same parts as the numbers in FIGS. 1 and 2.

Figure 4:
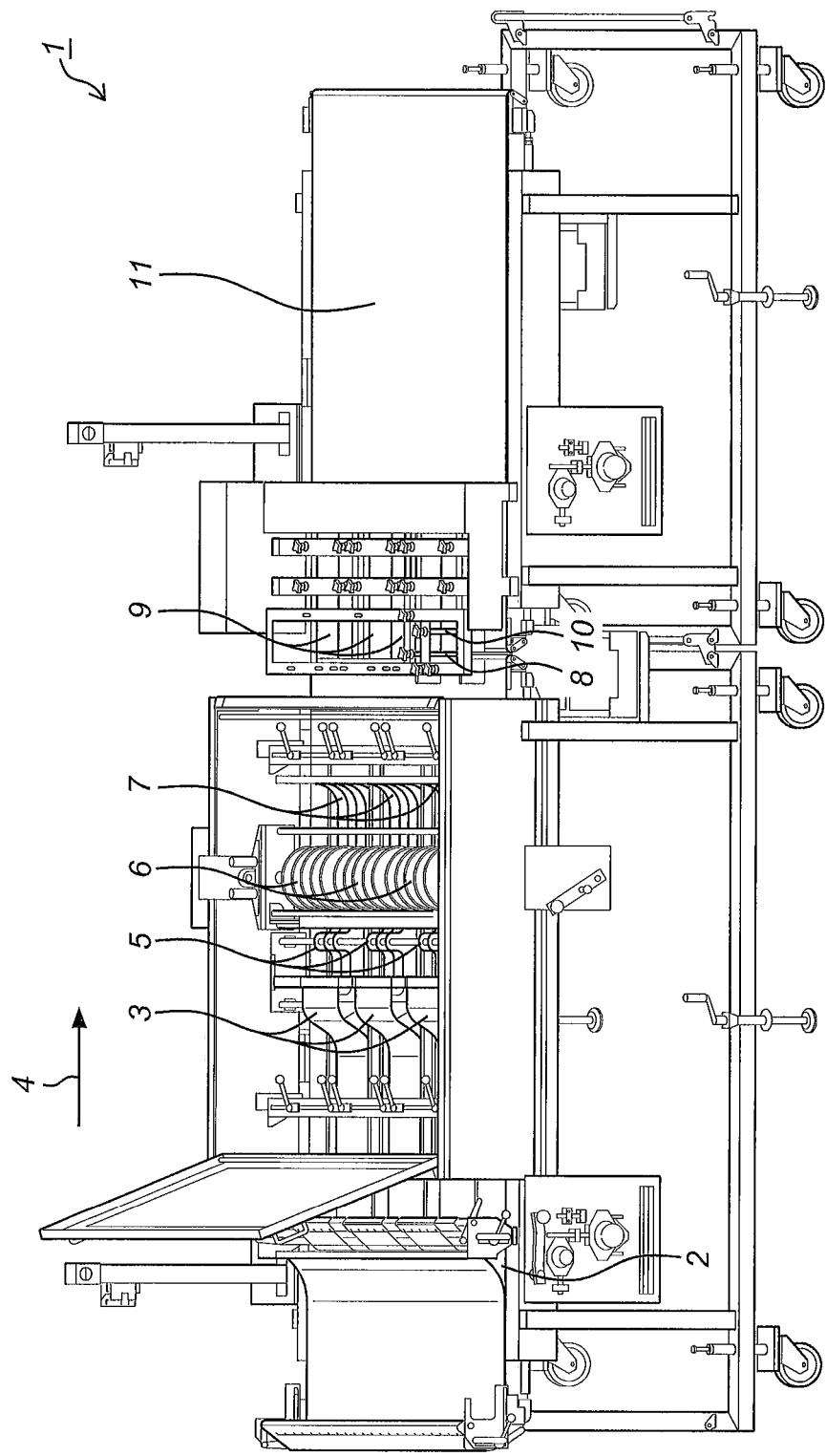
FIG. 4 shows a perspective view of a device according to the invention.

FIG. 4 shows a perspective view of a device from FIG. 3.

The invention claimed is:
1. A device for treating dough, comprising:
a horizontally extending conveyor, for conveying a flat dough sheet;
at least one mat, arranged above the conveyor, with the at least one mat's end downstream the direction of conveyance resting on or slightly above the conveyor, for rolling up the dough sheet when it is conveyed underneath;
at least one fence, forming a blunt sealing knife, arranged vertically at a distance above the conveyor surface and extending in the direction of conveyance, downstream the at least one mat, for notching and therewith sealing the rolled up dough sheet without cutting it;
at least one rotatable knife, arranged at the downstream outermost end of the at least one fence and in the plane of said at least one fence, for cutting the notched dough piece, wherein
the end of the at least one fence adjacent to the at least one rotatable knife form-fits the at least one rotatable knife.
2. The device according to claim 1, wherein the conveyor extends in the same plane, beyond the at least one rotatable knife.
3. The device according to claim 1, comprising:
a first pin, arranged behind the at least one knife in the direction of conveyance, for pivoting the cut dough pieces thereabout; and
at least one pair of vertically arranged conveyors, starting downstream the knife and extending in the direction of conveyance, for guiding and/or pressing the cut dough pieces.
4. The device according to claim 1, comprising:
at least a second and a third mat, arranged at both sides beside the at least one rotatable knife, for enabling synchronous movement of cut dough pieces.
5. The device according to claim 4, comprising a second pin, arranged downstream from the first pin, for further rotating the dough pieces.
6. The device according to claim 4, wherein the first and second pins are exchangeable, for treating various kinds of dough.
7. The device according to claim 5, wherein the second pin has a larger diameter than the first pin.
8. The device according to claim 6, comprising at least one pair of vertically extending conveyors, extending in the direction of conveyance for guiding and/or pressing the rotated dough pieces.
9. A method for operating a device according to claim 1, wherein the conveyor comprises two parts, wherein a first part has a first speed, and a second part, starting behind the knives, has a second speed, factor of 5 to 10 lower than the first speed.

* * * * *